UNITED STATES PATENT OFFICE.

WILLIAM PAINTER, OF BALTIMORE, MARYLAND, ASSIGNOR TO THE CROWN CORK AND SEAL COMPANY, OF SAME PLACE.

GLUTEN COMPOUND.

SPECIFICATION forming part of Letters Patent No. 619,337, dated February 14, 1899.

Application filed January 14, 1898. Serial No. 666,663. (No specimens.)

*To all whom it may concern:*

Be it known that I, WILLIAM PAINTER, a citizen of the United States, residing at Baltimore, Maryland, have invented certain new and useful Improvements in Gluten Compounds, of which the following is a specification.

It is the object of my invention to produce a compound adapted to be used for purposes similar to those for which hard rubber, ebonite, celluloid, indurated fiber, and similar compounds are now used.

My improved compound consists of gluten and granulated or pulverized cork or other pulverulent, granular, fibro-granular, or fibrous substances—such as the bran of wheat, asbestos, ground leather, wood-pulp, lampblack, ground straw, sulfur, or asphaltum—and any suitable coloring-matter may be added as may be found desirable.

In the production of gluten from wheat or other cereals the following properties of this substance are well known: First, as extracted in the wet state from substances containing it it is very tenacious and adhesive and is in that state practically insoluble in water, and, second, in its wet plastic state it quickly ferments, loses its tenacious and adhesive qualities, and becomes partially soluble and valueless for any purpose requiring insolubility in water. If, however, it be subjected to a process of desiccation either at atmospheric or higher temperatures before fermentation begins, it loses all tendency to ferment and if carried to absolute dryness becomes hardened into a translucent substance resembling horn and becomes incapable of being again brought to a plastic state by immersion in water. Its insolubility and the tenacious and adhesive qualities which it possesses in the plastic state render it a desirable substance for many uses in the arts, providing these qualities can be maintained in a product containing it.

I have found that not only does mere desiccation at ordinary temperatures up to a certain condition of dryness produce in it such a change as precludes, when brought into contact with water, its return to the plastic condition which it assumes as extracted from substances containing it, but that subjecting it to temperatures of from 200° Fahrenheit upward has the effect to indurate it and render it less permeable to watery liquids in proportion as the temperature employed is high, up to that at which carbonization or decomposition begins, and somewhat in proportion to the period for which a given temperature is maintained.

I have also found that in drying the gluten from the original wet state by manipulating it under temperatures of about 200° Fahrenheit before incorporating with it the body material or during that process measurably the same indurating effect upon the gluten is produced as when subjected to heat after incorporation, and for some purposes this method is employed.

As an example of one application of the invention I incorporate gluten in the plastic state with ground or pulverized cork in the proportion by weight of about two of gluten and one of cork. When thoroughly incorporated, I roll or mold it into the desired form and subject it for about ten hours to a temperature of about 250° Fahrenheit or similarly subject the gluten before or during incorporation to similar temperatures, or both processes may be carried out, as may best suit the desired qualities in the product. The product may then be sawed, cut, or worked into any further form desired for various purposes. It may also be molded into the finished form before subjecting it to the artificial heat. For some purposes requiring a softer or more pliable product I find it advantageous to treat it after baking by soaking it in melted wax, paraffin, ceresin, or other similar substances.

What I claim is—

1. A compound of gluten and a ground or pulverized body material, substantially as described.

2. The method herein described, consisting in incorporating with gluten in the plastic condition, a granular, pulverized, fibro-granular or fibrous material, rolling or molding the compound into form and subjecting the material to heat, substantially as described.

In testimony whereof I affix my signature in presence of two witnesses.

WILLIAM PAINTER.

Witnesses:
JOHN T. HAWKINS,
W. H. WHEELER.